W. NORTHROP.
MACHINE FOR PEELING POTATOES AND THE LIKE.
APPLICATION FILED APR. 28, 1910.
1,066,519.
Patented July 8, 1913.
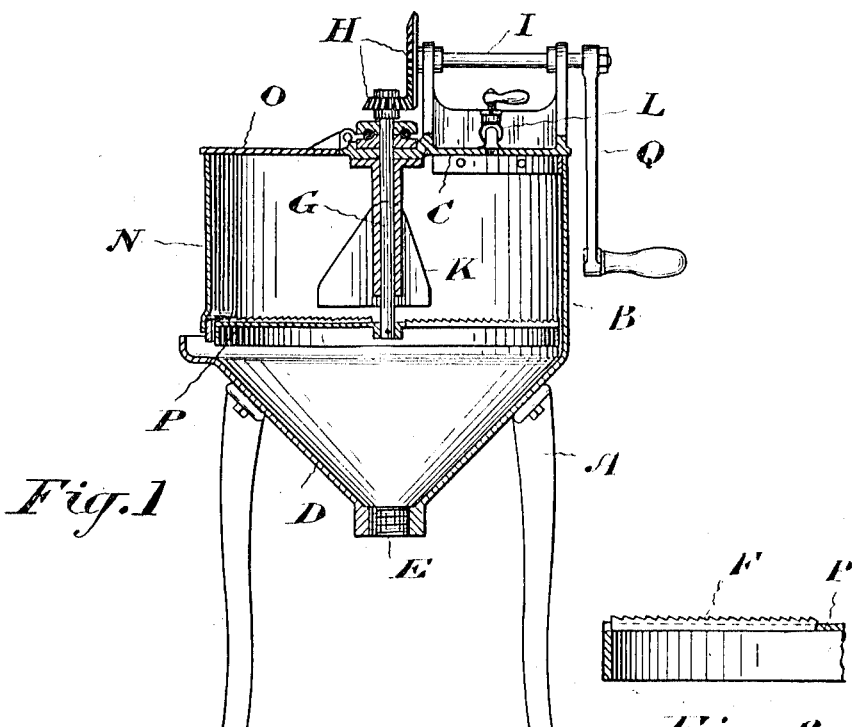
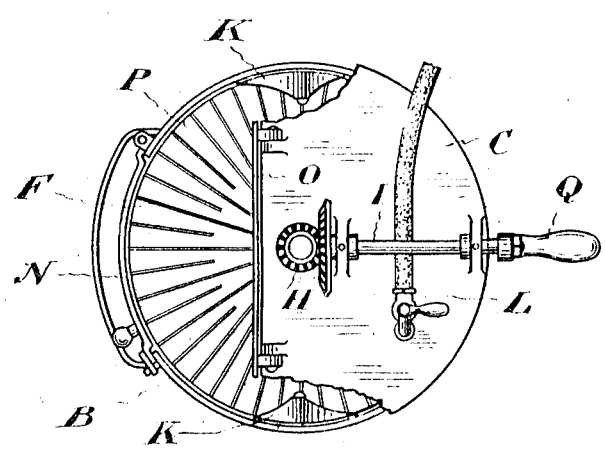
WITNESSES:
W. J. McMillan
E. P. Hall.
INVENTOR.
Walter Northrop
BY Ridout & Maybee
ATTORNEY.

UNITED STATES PATENT OFFICE.

WALTER NORTHROP, OF TORONTO, ONTARIO, CANADA, ASSIGNOR TO HERBERT J. ATKINSON AND FREDERICK ATKINSON, BOTH OF TORONTO, CANADA.

MACHINE FOR PEELING POTATOES AND THE LIKE.

1,066,519.  Specification of Letters Patent.  Patented July 8, 1913.

Application filed April 28, 1910. Serial No. 558,243.

*To all whom it may concern:*

Be it known that I, WALTER NORTHROP, of the city of Toronto, Province of Ontario, Canada, have invented certain new and useful Improvements in Machines for Peeling Potatoes and the Like, of which the following is a specification.

My object is to devise a machine which will quickly and effectively remove the skin from the potatoes and the like without wasting the substance of the potato.

In putting my invention into practice I employ a stationary cylindrical vessel, at the bottom of which is located a rotary disk provided with a novel decorticating surface. The difficulty has been to prevent the potatoes being cut into too deeply in some places before the skin on the rest of the potato was entirely removed. This was due to the fact that centrifugal action caused the potatoes to crowd together at the circumference of the disk, without properly rotating, and also to the impossibility of speeding up the disk sufficiently to rapidly tumble the potatoes without at the same time causing it to cut too rapidly into any potato which happened to be held in contact with it in any way for more than a very brief period of time at any one part.

I have overcome the difficulties, 1st, by securing to the receptacle one or more vertical deflectors inclined inwardly and adapted to force the potatoes coming into contact with them into the center of the machine; 2nd, by forming the decorticating surface of the disk with a series of radial serrated blades separated by alternate smooth portions of the plane upper surface of the disk. The disk may thus be speeded up without wasteful cutting of the potatoes, and the friction of the potatoes on the rapidly rotating disk will then effectively tumble them to expose all parts of their surface evenly to the decorticating action.

Further improvements lie in the means I employ for discharging the peeled potatoes, and in other details of construction hereinafter more specifically described, and then definitely claimed.

Figure 1 is a vertical section of the machine. Fig. 2 is a plan view of the same. Fig. 3 is a side elevation of part of the same.

In the drawings like letters of reference indicate corresponding parts in the different figures.

Referring particularly to Fig. 1 A is the frame supporting the receptacle B. This receptacle is preferably provided with a cover C, having a hinged portion O through which potatoes may be introduced into the receptacle.

D is the true bottom of the receptacle preferably inclined from the circumference to the center so that water and peelings from the potatoes will drain to the center whence they may be carried off through the pipe E.

Above the true bottom is a false bottom comprising a suitably shaped disk P secured to the shaft G, vertically journaled from cover of the apparatus. This vertical shaft is driven by bevel gearing H from the suitably journaled horizontal shaft I provided with an ordinary crank handle Q. The disk P supports the decorticating disk F. This disk instead of having its whole upper surface formed as a decorticating surface is formed in sections alternately cutting and non-cutting as regards their upper surface. The cutting sections are preferably formed of serrated blades such as ordinary hack-saw blades set in substantially radial grooves in the disk with their serrated edges slightly above the surface of the disk. By this construction of the disk I secure the advantages already set out in the preamble to this specification. In addition, the saw blades will be found to be durable and when worn are readily removed and sharpened or replaced.

Secured to the sides of the receptacle, diametrically opposite to, one another, are two deflectors K, each formed preferably of a piece of sheet metal bent to give the deflectors a substantially triangular form in cross section, the base of the triangle being applied to the wall of the receptacle. The sides are preferably curved as shown and the vertical cross sections are also substantially triangular. One of the concaved faces of the deflectors is more extensive than the other, the two faces being curved on different arcs. The less extensive face of one of the deflectors being arranged diametrically opposite the more extensive face of the other deflector. These deflectors change the direction of motion of the potatoes which strike them and throw the potatoes in toward the center, tending also to turn them over by a vertical rotary movement. This not only distributes the work over the surface of the disk but prevents the grinding away of the substance of the potato, as already set out in the preamble to this specification. Each deflector being double will operate effectively no matter in which direction the disk may be rotated. It will be noted that when the scraper is turned in a direction to throw the potatoes in contact with the less extensive face, the same will direct the potatoes toward the center of the scraper at a different angle than when the potatoes are thrown in contact with the more extensive face, this variation in the throw securing a more effectual scraping than where the deflector is arranged to throw the potatoes at the same angle.

Water for washing purposes is introduced through the nozzle L, to which may be connected a hose leading from any suitable source of supply.

In the side of the receptacle I provide an opening normally closed by the door N.

The operation of the device is substantially as follows:—Potatoes in proper quantities are introduced through the cover, the water turned on and the machine started in motion. The rotation of the disk brings every part of the surface of each potato in contact with the decorticating surface thereof effectually grinding off the skin. The ground skins and dirt are washed down to the lower or true bottom whence they pass through the pipe E. When the potatoes are finished, the door is opened, and they are discharged by the centrifugal force imparted to them by the disk.

A machine constructed as I have described will be found to be very effective in operation, doing work very quickly and with little loss.

What I claim as my invention is:

1. A vegetable peeler including a receptacle, a rotary scraper disposed within the receptacle, diametrically disposed deflectors secured to the inner wall of the receptacle, said deflectors being formed with concaved faces one of which is more extensive than the other, the more extensive face of one of said deflectors being disposed diametrically opposite the less extensive face of the other deflector.

2. A vegetable peeler including a receptacle, a rotary scraper disposed within said receptacle, deflectors secured to the inner wall of the receptacle, said deflectors being formed with concaved faces, one of which is more extensive than the other.

Toronto, Ont., August, 1909.

WALTER NORTHROP.

Signed in the presence of—
J. EDW. MAYBEE,
E. P. HALL.